(12) United States Patent
Kawamura et al.

(10) Patent No.: US 10,096,425 B2
(45) Date of Patent: Oct. 9, 2018

(54) MULTILAYER CERAMIC CAPACITOR HAVING DIELECTRIC LAYERS CONTAINING CERAMIC GRAINS CONSTITUTED BY PRIMARILY BATIO$_3$ AND ADDITIONALLY MO, MN, R, AND V/W

(71) Applicant: TAIYO YUDEN CO., LTD., Taito-ku, Tokyo (JP)

(72) Inventors: Chie Kawamura, Takasaki (JP); Yoichiro Ogata, Takasaki (JP); Tetsuo Shimura, Takasaki (JP); Minoru Ryu, Takasaki (JP); Yoshiki Iwazaki, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 29 days.

(21) Appl. No.: 15/220,064

(22) Filed: Jul. 26, 2016

(65) Prior Publication Data
US 2017/0032894 A1 Feb. 2, 2017

(30) Foreign Application Priority Data

Jul. 28, 2015 (JP) .................................. 2015-148649

(51) Int. Cl.
*H01G 4/12* (2006.01)
*H01G 4/30* (2006.01)

(52) U.S. Cl.
CPC ............. *H01G 4/1227* (2013.01); *H01G 4/30* (2013.01)

(58) Field of Classification Search
CPC ................................ H01G 4/1227; H01G 4/30
See application file for complete search history.

(56) References Cited

U.S. PATENT DOCUMENTS

| 6,710,000 | B2 * | 3/2004 | Kawamoto | B32B 18/00 361/321.4 |
| 7,006,345 | B2 | 2/2006 | Nakano et al. | |
| 8,437,115 | B2 * | 5/2013 | Kim | H01G 4/30 361/305 |
| 8,593,038 | B2 | 11/2013 | Kang et al. | |

(Continued)

FOREIGN PATENT DOCUMENTS

| JP | 2011256091 A | 12/2011 |
| JP | 2013211398 A | 10/2013 |

OTHER PUBLICATIONS

U.S. Appl. No. 15/220,120, Multilayer Ceramic Capacitor, filed Jul. 26, 2016.

*Primary Examiner* — David M Sinclair
(74) *Attorney, Agent, or Firm* — Law Office of Katsuhiro Arai

(57) ABSTRACT

A multilayer ceramic capacitor includes a laminate constituted by internal electrode layers of different polarities alternately layered via dielectric layers, wherein the multilayer ceramic capacitor is such that the dielectric layers contain ceramic grains whose primary component is BaTiO$_3$, the ceramic grains contain Mo, Mn, rare earth R, and at least one of V and W, and the average valence number of Mo in the ceramic grains is 4.50 to 5.50. The multilayer ceramic capacitor can offer excellent service life characteristics and sufficiently suppress leak current even when the thickness of the dielectric layer is 0.8 μm or less.

16 Claims, 1 Drawing Sheet

(56) References Cited

U.S. PATENT DOCUMENTS

| | | | |
|---|---|---|---|
| 2002/0016247 A1* | 2/2002 | Mizuno | C04B 35/468 |
| | | | 501/32 |
| 2002/0049131 A1* | 4/2002 | Kawamoto | C04B 35/4682 |
| | | | 501/139 |
| 2002/0137622 A1* | 9/2002 | Tokita | C04B 35/4682 |
| | | | 501/137 |
| 2002/0177519 A1 | 11/2002 | Kawamoto et al. | |
| 2008/0112109 A1 | 5/2008 | Muto et al. | |
| 2008/0169530 A1* | 7/2008 | Koebrugge | C04B 35/4682 |
| | | | 257/532 |
| 2008/0214382 A1* | 9/2008 | Masumura | C04B 35/4682 |
| | | | 501/138 |
| 2009/0086407 A1 | 4/2009 | Takahashi et al. | |
| 2010/0165541 A1 | 7/2010 | Sasabayashi et al. | |
| 2012/0033344 A1 | 2/2012 | Nakamura | |
| 2014/0268484 A1 | 9/2014 | Kang et al. | |
| 2017/0032895 A1 | 2/2017 | Ogata et al. | |

\* cited by examiner

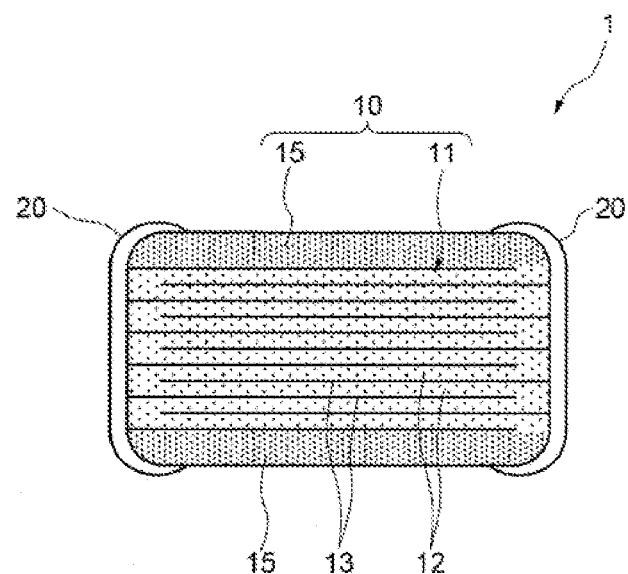

MULTILAYER CERAMIC CAPACITOR HAVING DIELECTRIC LAYERS CONTAINING CERAMIC GRAINS CONSTITUTED BY PRIMARILY BATIO$_3$ AND ADDITIONALLY MO, MN, R, AND V/W

BACKGROUND

Field of the Invention

The present invention relates to a multilayer ceramic capacitor whose dielectric layers are constituted by ceramic grains of a specific composition.

Description of the Related Art

In recent years, there is a high demand for smaller electronic components to support increasingly dense electronic circuits used in mobile phones, tablet terminals, and other digital electronic devices, and multilayer ceramic capacitors (MLCC) that constitute these circuits are rapidly becoming smaller in size and larger in capacitance.

The capacitance of a multilayer ceramic capacitor is directly proportional to the dielectric constant of the constitutional material of the dielectric layers constituting the capacitor and also to the number of dielectric layers, and inversely proportional to the thickness of one dielectric layer. Accordingly, meeting the demand for size reduction requires increasing the dielectric constant of the material, while also reducing the thickness of the dielectric layers and thereby increasing the number of dielectric layers.

However, making the dielectric layers thinner increases the voltage applied per unit thickness, which in turn shortens the length of service life of the dielectric layers and reduces the reliability of the multilayer ceramic capacitor. Accordingly, dielectric compositions have been proposed, where donor elements such as Mo and W are added to improve the service life.

Also, Patent Literature 1 describes barium titanate ceramic grains in the form of a dielectric ceramic that gives multilayer ceramic capacitors offering good capacitance temperature characteristics and excellent service life characteristics, characterized in that it has a core and a shell, and contains rare earth element R and M (M is at least one type of element selected from the group that consists of Mg, Mn, Ni, Co, Fe, Cr, Cu, Al, Mo, W and V) as secondary components, where the total concentration of R and M slopes from the grain boundary to the core and becomes minimum in one area and maximum in another area.

In an example provided in the aforementioned literature, a multilayer ceramic capacitor whose dielectric layer is 1 μm thick is produced using a material prepared by adding 0.5 mol of Mn, 0.2 mol of Mo, and 1.0 mol of Gd to 100 mol of barium titanate.

BACKGROUND ART LITERATURES

[Patent Literature 1] Japanese Patent Laid-open No. 2011-256091

SUMMARY

There is an ongoing effort to make dielectric layers thinner in recent years, and their thickness has now become less than 1 μm. Accordingly, there is room for improving the service life characteristics under the invention described in Patent Literature 1 when the thickness of the dielectric layer is 0.8 μm or less, for example.

Also, when dielectric layers become thinner, shorting occurs between the internal electrodes that are stacked in a manner alternately led out to the external electrodes on the opposite sides, which magnifies the problem of leak current.

Accordingly, an object of the present invention is to provide a multilayer ceramic capacitor offering excellent service life characteristics and sufficiently suppressing leak current even when the thickness of the dielectric layer is 0.8 μm or less.

Any discussion of problems and solutions involved in the related art has been included in this disclosure solely for the purposes of providing a context for the present invention, and should not be taken as an admission that any or all of the discussion were known at the time the invention was made.

The present invention is a multilayer ceramic capacitor having a laminate constituted by internal electrode layers of different polarities alternately stacked via dielectric layers, wherein the multilayer ceramic capacitor is such that the dielectric layers contain ceramic grains whose primary component is BaTiO$_3$, the ceramic grains contain Mo, Mn, rare earth R, and at least one of V and W, and the average valence number of Mo in the ceramic grains is 4.50 to 5.50.

Preferably the amount of Mo in the dielectric layers is 0.1 to 0.3 mol per 100 mol of BaTiO$_3$.

By adjusting the amount of Mo in this range, it becomes easier to adjust the average valence number of Mo (4 or 6 for single atoms) to fall within the range specified by the present invention.

Preferably the amount of Mn in the dielectric layers is 0.03 to 0.2 mol per 100 mol of BaTiO$_3$.

By adjusting the amount of Mn in this range, it becomes easier to adjust the average valence number of Mo to fall within the range specified by the present invention.

Preferably the amount of rare earth R in the dielectric layers is 0.5 to 1.5 mol per 100 mol of BaTiO$_3$.

By adjusting the amount of rare earth R in this range, it becomes easier to adjust the average valence number of Mo to fall within the range specified by the present invention.

With the multilayer ceramic capacitor proposed by the present invention, preferably the thickness of the dielectric layer is 0.8 μm or less.

By reducing the thickness of the dielectric layers this way, the capacitance of the multilayer ceramic capacitor can be increased, and furthermore according to the present invention, excellent service life characteristics of the capacitor and suppression of leak current can be achieved.

According to the present invention, a multilayer ceramic capacitor offering excellent service life characteristics and sufficiently suppressing leak current even when the thickness of the dielectric layer is 0.8 μm or less, is provided.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIG. 1 shows a schematic longitudinal cross-section view of a multilayer ceramic capacitor according to an embodiment of the present invention.

DESCRIPTION OF THE SYMBOLS

1 Multilayer ceramic capacitor
10 Ceramic sintered compact
11 Laminate
12 Dielectric layer
13 Internal electrode layer
15 Cover layer
20 External electrode

DETAILED DESCRIPTION OF EMBODIMENTS

A multilayer ceramic capacitor according to an embodiment of the present invention is explained below. FIG. 1 shows a schematic longitudinal cross-section view of a multilayer ceramic capacitor 1 conforming to the present invention.

[Multilayer Ceramic Capacitor]

The multilayer ceramic capacitor 1 generally comprises a ceramic sintered compact 10 which is a sintered compact of ceramic grains having standardized chip dimensions and shape (such as rectangular solid of 1.0×0.5×0.5 mm), as well as a pair of external electrodes 20 formed on both sides of the ceramic sintered compact 10. The ceramic sintered compact 10 has a laminate 11 whose primary component is grain crystal containing $BaTiO_3$ and which internally has internal electrode layers 13 that are alternately stacked via dielectric layers 12, and also has cover layers 15 formed as outermost layers at the top and bottom in the laminating direction. Though not illustrated, there are also side margins that cover the laminate 11 (more specifically, the internal electrode layers 13 thereof) to prevent it from being exposed to the outside.

The laminate 11 has a high-density, multi-layer structure of around several hundreds to a thousand layers in total, where the thickness of the dielectric layer 12 sandwiched by two internal electrode layers 13 is set within a specified range (normally 0.8 μm or less) according to the capacitance, required pressure resistance, and other specifications.

The cover layers 15 formed at the outermost layer parts of the laminate 11 protect the dielectric layers 12 and internal electrode layers 13 from humidity, contaminants, and other pollutants from the outside and thereby prevent them from deteriorating over time.

Also, the ends of the internal electrode layers 13 are alternately led out and electrically connected to the pair of external electrodes 20 of different polarities present at both longitudinal ends of the dielectric layers 12.

Also, the dielectric layers 12 of the multilayer ceramic capacitor 1 conforming to the present invention contain ceramic grains whose primary component is $BaTiO_3$, the ceramic grains contain Mo, Mn, rare earth R, and at least one of V and W, and the average valence number of Mo in the ceramic grains is 4.50 to 5.50. In some embodiments, "the primary component is $BaTiO_3$" refers to a structure where a main or major structure of each ceramic grain is constituted by an inorganic compound with the chemical formula $BaTiO_3$ or $Ba_1Ti_1O_3$.

Because the ceramic grains constituting the dielectric layers contain specified elements and also because the average valence number of Mo in the ceramic grains is 4.50 to 5.50, the multilayer ceramic capacitor 1 conforming to the present invention offers excellent service life characteristics and also sufficiently suppresses leak current even when the thickness of the dielectric layer 12 is 0.8 μm or less.

To be more specific, the valence number of Mo in the dielectric layer is 4 or 6 (e.g., the valence number of Mo in $MoO_2$ is 4, and that in $MoO_3$ is 6). Mo is a donor element, but the higher the valence number of Mo, the fewer the donor-level electrons become and less smoothly the electrons tend to flow, which contributes to smaller leak current. In addition, the fewer the donor-level electrons, the more the oxygen voids in the $BaTiO_3$ crystal structure there are, which contributes to shorter capacitor service life.

On the other hand, the lower the valence number of Mo, the more the donor-level electrons there are and the more smoothly the electrons tend to flow, which contributes to larger leak current. In addition, the more the donor-level electrons, the fewer the oxygen voids in the $BaTiO_3$ crystal structure there are, which contributes to longer capacitor service life.

As explained above, increasing or decreasing the valence number of Mo improves one of the service life characteristics and leak current but worsens the other, indicating that the service life characteristics and leak current are in a trade-off relationship. Under the present invention, service life characteristics and suppression of leak current are achieved simultaneously by adopting a range of average valence number of 4.50 to 5.50. Although the valence number of Mo is 4 or 6, the average valence number of Mo in the dielectric layers varies depending on how Mo is present in the dielectric layers. The "average" refers to the average of a randomly selected dielectric layer of a multilayer ceramic capacitor or the average of the entire dielectric layers of the multilayer ceramic capacitor. How to measure the average valence number is explained in detail in "Examples" later.

The aforementioned range of average valence number is influenced by various factors. For example, the amount of Mo in the dielectric layer 12 influences the average valence number of Mo. Under the present invention, adjusting the aforesaid amount, preferably to a range of 0.1 to 0.3 mol per 100 mol of $BaTiO_3$, makes it easy to adjust the average valence number of Mo to fall within a range of 4.50 to 5.50. It should be noted that, in the aforementioned range of Mo amount, the greater the amount of Mo, the lower the average valence number of Mo tends to become.

Furthermore, Mn also influences the average valence number of Mo. Under the present invention, adjusting the amount of Mn in the dielectric layer 12, preferably to a range of 0.03 to 0.20 mol per 100 mol of $BaTiO_3$, makes it easy to adjust the average valence number of Mo to fall within a range of 4.50 to 5.50. It should be noted that the aforementioned range of average valence number of Mo can be achieved and the effects of the present invention manifest even when Mg is used instead of Mn for part of the total Mn amount added (in other words, even when Mn is partially replaced with Mg). Also, in the aforementioned range of Mn amount, the greater the amount of Mn, the higher the average valence number of Mo tends to become.

Rare earth R also influences the average valence number of Mo. Under the present invention, any metal which is classified as rare earth can be used without any limitation; from the viewpoint of adjusting the average valence number of Mo to a range of 4.50 to 5.50, however, Ho, Y, Dy, Gd, Tb, Er, Sm, and Eu are preferable, among which Ho, Y, Dy, and Gd are more preferable. Also, under the present invention, adjusting the amount of rare earth R (or total amount if two or more types of R are used) in the dielectric layer 12, preferably to a range of 0.5 to 1.5 mol per 100 mol of $BaTiO_3$, makes it easy to adjust the average valence number of Mo to fall within a range of 4.50 to 5.50. It should be noted that, in the aforementioned range of R amount, the greater the amount of rare earth R, the lower the average valence number of Mo tends to become.

V and W also influence the average valence number of Mo. Under the present invention, adjusting the amount of at least one of V and W (or total amount if both V and W are used), in the dielectric layer 12, preferably to a range of 0.046 to 0.250 mol per 100 mol of $BaTiO_3$, makes it easy to adjust the average valence number of Mo to fall within a range of 4.50 to 5.50.

It should be noted that the amounts of the various metal elements explained above in the dielectric layer 12 can be measured by ICP (inductively coupled plasma) atomic emission spectroscopy, for example, normally as equivalent values of oxide or carbonate. Also, these values roughly correspond to the amounts of materials of the respective metal elements added when the multilayer ceramic capacitor is manufactured as described later.

Besides the foregoing, the thickness of the cover layer 15, thickness of the side margin, and thickness of the internal electrode layer 11 of the multilayer ceramic capacitor 1 conforming to the present invention are not limited in any way; however, the thickness of the cover layer 15 is normally 4 to 50 µm, thickness of the side margin is normally 4 to 50 µm, and thickness of the internal electrode layer 11 is normally 0.26 to 1.00 µm.

[Method for Manufacturing Multilayer Ceramic Capacitor]

The following explains the method for manufacturing the multilayer ceramic capacitor proposed by the present invention as explained above.

First, a material powder for forming the dielectric layer is prepared. For the material powder, a $BaTiO_3$ powder for forming ceramic sintered compact can be used.

$BaTiO_3$ is a tetragonal chemical compound of perovskite structure that exhibits high dielectric constant. This $BaTiO_3$ is generally obtained by synthesizing barium titanate by causing titanium dioxide or other titanium material to react with barium carbonate or other barium material.

It should be noted that the specific surface area of titanium material is preferably in a range of 10 to 300 $m^2/g$ from the viewpoint of synthesizing fine $BaTiO_3$, while the specific surface area of barium material is preferably in a range of 10 to 50 $m^2/g$ from the viewpoint of synthesizing fine $BaTiO_3$.

Various methods for synthesizing $BaTiO_3$ are known, such as the solid-phase method, sol-gel method, and hydrothermal method, for example. Under the present invention, any of these methods can be adopted.

Under the present invention, Mo, Mn, rare earth R, and at least one of V and W, are added to adjust the average valence number of Mo in the ceramic grains to fall within a range of 4.50 to 5.50. These are added as chemical compounds (such as oxides) containing the respective metal elements. It should be noted that Mn can be partially replaced with Mg, as described above.

The adding stages are not limited in any way; for example, chemical compounds containing the aforementioned metal elements can be mixed with titanium material and barium material when $BaTiO_3$ synthetic reaction is performed, so that by performing $BaTiO_3$ synthetic reaction, $BaTiO_3$ grains in which the aforementioned metal elements are already present as solid solutions are obtained. Or, chemical compounds containing these metal elements can be added after a material powder, $BaTiO_3$ powder, is prepared, for use in the manufacturing processes (sintering processes, etc.) of the multilayer ceramic capacitor.

Also, specified additive chemical compounds may be added to the obtained material powder according to the purpose. The aforementioned additive chemical compounds may be oxides of Cr, Co, Ni, Nb, Li, B, Na, K, and Si, among others.

In some embodiments, any one or more elements described as alternative or optional element(s) in the present disclosure can explicitly be eliminated from the ceramic grains. Further, in some embodiments, the ceramic grains may consisting of required elements described in the present disclosure; however, "consisting of" does not exclude additional components that are unrelated to the invention such as impurities ordinarily associated therewith.

For example, the material powder thus obtained may be crushed to adjust the grain size or classified further to regulate the grain size, if necessary.

Thereafter, polyvinyl butyral (PVB) resin or other binder, ethanol, toluene or other organic solvent, and dioctyl phthalate (DOP) or other plasticizer, are added to the material powder and then wet-mixed. The obtained slurry is applied in belt shapes on a substrate using the die-coater method or doctor blade method, for example, and then dried to obtain a dielectric green sheet of 1.2 µm or less in thickness. Then, by screen-printing or gravure-printing a metal conductive paste containing organic binder on the surface of the dielectric green sheet, internal electrode layer patterns alternately led out to the pair of external electrodes of different polarities are placed. For the aforementioned metal, nickel is widely adopted from the viewpoint of cost. It should be noted that barium titanate of 50 nm or less in average grain size may be dispersed evenly, as co-material, in the metal conductive paste.

Thereafter, the dielectric green sheet on which the internal electrode layer patterns have been printed is stamped out to specified sizes and a specified number (such as 100 to 1000) of sheets stamped out from the dielectric green sheet are stacked in such a way that, with the base material separated, the internal electrode layers and dielectric layers alternate and the ends of the internal electrode layers are alternately exposed to the two end faces of the dielectric layers in the length direction and led out alternately to the pair of external electrodes of different polarities. Cover sheets that will become the cover layers are pressure-welded to the top and bottom of the stacked dielectric green sheets, which are then cut to specified chip dimensions (such as 1.2 mm×0.75 mm×0.75 mm).

Next, side margins are formed, and any of the various known methods can be adopted without any limitation. For example, at the time of the aforementioned cutting to specified chip dimensions, the dielectric layers are cut, not at the exact positions of the internal electrode layers, but at slightly offset locations so that parts of the dielectric layers not covered by the internal electrode layers are also included, to form side margins of desired thickness on both side faces of the laminate. Side margins can also be formed after cutting by applying a specified material (normally material similar to that of the dielectric layer) on the side faces of the cut laminate where side margins are to be formed.

Thereafter, a Ni conductive paste that will become the external electrodes is applied on both end faces of the cut laminate and dried. This way, a compact of a multilayer ceramic capacitor is obtained. External electrodes can also be formed on both end faces of the laminate according to the sputtering method, etc.

The compact of a multilayer ceramic capacitor thus obtained is put through a $N_2$ ambience of 250 to 500° C. to remove the binder, and then sintered for 10 minutes to 2 hours at 1100 to 1300° C. in a reducing ambience to sinter the chemical compounds constituting the dielectric green sheet and grow the grains. This way, a multilayer ceramic capacitor 1 that has a laminate 11 which internally has alternately stacked dielectric layers 12 constituted by a sintered compact of ceramic grains and internal electrode layers 13, and also has cover layers 15 formed as outermost layers at the top and bottom in the laminating direction, is obtained.

Also, under the present invention, reoxidization may be performed at 600 to 1000° C.

Additionally, as another embodiment relating to the method for manufacturing a multilayer ceramic capacitor, external electrodes and dielectrics can be sintered in different processes. For example, a laminate of layered dielectrics can be sintered and then a conductive paste can be baked on both ends thereof to form external electrodes.

EXAMPLES

The present invention is explained in greater detail using examples below. It should be noted, however, that the present invention is not limited to these examples in any way.

Example 1

$BaCO_3$ (specific surface area 30 m²/g) and $TiO_2$ (specific surface area 50 m²/g) were added to an aqueous solution of ion-exchanged water to which dispersant was added, in such a way that the Ba/Ti mol ratio became 1, and the obtained slurry was mixed/dispersed using a bead mill. The slurry was dried to remove water, and then tentatively sintered at 935° C. to synthesize $BaTiO_3$ of 100 nm in average grain size based on a SEM photograph.

Next, the various additive materials were added at the ratios of $MoO_3$=0.2 mol, $(Ho_2O_3)/2$=0.75 mol, $MnCO_3$=0.03 mol, $WO_3$=0.184 mol, and $SiO_2$=1.0 mol per 100 mol of $BaTiO_3$ (all equivalent values as each chemical compound), after which solvent was added to obtain a slurry. PVB binder was added to the slurry and the slurry was applied on a PET film to a thickness of 1.0 μm to obtain a green sheet.

Next, a Ni conductive paste was printed on the green sheet as internal electrodes and this was used to produce a 400-layer multilayer ceramic capacitor of the 1005 shape. After removing the binder, the capacitor was sintered for 0.5 hour at 1200° C. in a reducing ambience (partial oxygen pressure $1.0 \times 10^{11}$ MPa) and then reoxidized at 800° C. in $N_2$ ambience. After sintering, the thickness of the dielectric layer was 0.8 μm, thickness of the internal electrode layer was 0.9 μm, and capacitance of the multilayer ceramic capacitor was approx. 10 μF.

Also, to check the average valence number of Mo contained in the dielectric layer of the multilayer ceramic capacitor, measurement by emission X-ray absorption spectroscopy was performed and an X-ray absorption near-edge structure (XANES) at the Mo K-absorption edge was detected using the fluorescence method.

As reference substances, XANESs at the Mo K-absorption edges of Mo, $MoO_2$, and $MoO_3$ were detected using the transmission method. The obtained XANESs were standardized using XAFS analysis software (product name: Athena). At the leading edge of the obtained spectrum, energy values corresponding to a standardized absorption coefficient of 0.7 were read for Mo, $MoO_2$, and $MoO_3$, and by considering them as zerovalent, tetravalent, and hexavalent, respectively, the correspondence of energy value and valence number was fitted using a linear function to create a calibration curve. The absorption coefficient of 0.7 was adopted to facilitate the understanding of valence number changes of Mo from zerovalent to tetravalent and hexavalent. It should be noted that REX2000 can also be used as the XAFS analysis software.

Then, the energy value at the K edge XANES corresponding to a standardized absorption coefficient of 0.7, which was obtained for Mo in the dielectric layer of the multilayer ceramic capacitor, was applied to the calibration curve to obtain an average valence number of Mo. As a result of measurement, the average valence number of Mo was 4.55. A skilled artisan will appreciate that the average valence number of Mo can be determined by any suitable method equivalent to those described in the present disclosure, and the skilled artisan can readily perform such a method in view of the present disclosure, as a matter of routine experimentation.

It should be noted that the sample for measurement by emission X-ray absorption spectroscopy, which was used to obtain the average valence number of Mo, was produced as follows. 10 to 30 multilayer ceramic capacitors produced were crushed into a powder of several tens of μm in grain size. This powder, although it contained the internal electrodes and external electrodes of the multilayer ceramic capacitor (in crushed state), was used as a sample for measurement by the emission X-ray absorption spectroscopy.

Next, when the high-temperature accelerated service life (time until the insulation resistivity (ρ) becomes $1 \times 10^{10}$ Ωcm at 105° C. in a direct-current electric field of 50 V/μm) of the produced multilayer ceramic capacitor was measured, it was 640 minutes (i.e., 100 minutes or more) which showed a good result. Also, the current value immediately after an elapse of 30 seconds in the high-temperature accelerated service life measurement was 90 μA (i.e., 100 μA or less), showing that leak current was being suppressed in addition to achieving excellent insulation performance.

A list of measured results (composition of added metal elements, average valence number of Mo, and high-temperature accelerated service life test results) for Examples 2 to 26 as well as Comparative Examples 1 to 6 explained below is shown in Table 1 afterward.

Example 2

A multilayer ceramic capacitor was produced in the same manner as in Example 1, except that $MnCO_3$ was added by 0.02 mol (equivalent value) and $(Ho_2O_3)/2$ was added by 0.50 mol (equivalent value). As a result, the average valence number of Mo became 4.52. The result of the high-temperature accelerated service life test of the multilayer ceramic capacitor was 470 minutes, and the current value after 30 seconds was 95 μA.

Example 3

A multilayer ceramic capacitor was produced in the same manner as in Example 1, except that $MnCO_3$ was added by 0.15 mol (equivalent value) and $(Ho_2O_3)/2$ was added by 1.80 mol (equivalent value). As a result, the average valence number of Mo became 4.90. The result of the high-temperature accelerated service life test of the multilayer ceramic capacitor was 950 minutes, and the current value after 30 seconds was 85 µA.

Example 4

A multilayer ceramic capacitor was produced in the same manner as in Example 1, except that $(Ho_2O_3)/2$ was added by 1.50 mol (equivalent value). As a result, the average valence number of Mo became 4.50. The result of the high-temperature accelerated service life test of the multilayer ceramic capacitor was 900 minutes, and the current value after 30 seconds was 95 µA.

Example 5

A multilayer ceramic capacitor was produced in the same manner as in Example 1, except that $MnCO_3$ was added by 0.75 mol (equivalent value). As a result, the average valence number of Mo became 4.90. The result of the high-temperature accelerated service life test of the multilayer ceramic capacitor was 1090 minutes, and the current value after 30 seconds was 1.2 µA.

Example 6

A multilayer ceramic capacitor was produced in the same manner as in Example 5, except that $WO_3$ was added by 0.092 mol (equivalent value) and $(V_2O_5)/2$ was added by 0.092 mol (equivalent value) so that additive materials V and W were added by a total of 0.184 mol. As a result, the average valence number of Mo became 5.05. The result of the high-temperature accelerated service life test of the multilayer ceramic capacitor was 1100 minutes, and the current value after 30 seconds was 1.0 µA.

Example 7

A multilayer ceramic capacitor was produced in the same manner as in Example 5, except that $MoO_3$ was added by 0.1 mol (equivalent value) and, instead of $WO_3$, $(V_2O_5)/2$ was added by 0.093 mol (equivalent value). As a result, the average valence number of Mo became 5.50. The result of the high-temperature accelerated service life test of the multilayer ceramic capacitor was 320 minutes, and the current value after 30 seconds was 0.05 µA.

Example 8

A multilayer ceramic capacitor was produced in the same manner as in Example 7, except that $MoO_3$ was added by 0.2 mol (equivalent value). As a result, the average valence number of Mo became 5.47. The result of the high-temperature accelerated service life test of the multilayer ceramic capacitor was 800 minutes, and the current value after 30 seconds was 0.2 µA.

Example 9

A multilayer ceramic capacitor was produced in the same manner as in Example 8, except that $(V_2O_5)/2$ was added by 0.046 mol (equivalent value). As a result, the average valence number of Mo became 5.50. The result of the high-temperature accelerated service life test of the multilayer ceramic capacitor was 300 minutes, and the current value after 30 seconds was 0.07 µA.

Example 10

A multilayer ceramic capacitor was produced in the same manner as in Example 8, except that $(V_2O_5)/2$ was added by 0.250 mol (equivalent value). As a result, the average valence number of Mo became 5.10. The result of the high-temperature accelerated service life test of the multilayer ceramic capacitor was 1020 minutes, and the current value after 30 seconds was 81 µA.

Example 11

A multilayer ceramic capacitor was produced in the same manner as in Example 7, except that $(V_2O_5)/2$ was added by 0.184 mol (equivalent value). As a result, the average valence number of Mo became 5.48. The result of the high-temperature accelerated service life test of the multilayer ceramic capacitor was 580 minutes, and the current value after 30 seconds was 0.1 µA.

Example 12

A multilayer ceramic capacitor was produced in the same manner as in Example 11, except that $MoO_3$ was added by 0.2 mol (equivalent value). As a result, the average valence number of Mo became 5.43. The result of the high-temperature accelerated service life test of the multilayer ceramic capacitor was 1180 minutes, and the current value after 30 seconds was 0.1 µA.

Example 13

$BaCO_3$ (specific surface area 30 m$^2$/g) and $TiO_2$ (specific surface area 50 m$^2$/g) were added to an aqueous solution of ion-exchanged water in which hexaammonium heptamolybdate tetrahydrate was dissolved and to which dispersant was added, in such a way that the Ba/Ti mol ratio became 1, and the obtained slurry was mixed/dispersed using a bead mill.

It should be noted that to this slurry, 0.2 mol of Mo was added in equivalent $MoO_3$ per 100 mol of $BaTiO_3$. The slurry was dried to remove water, and then tentatively sintered at 930° C. to synthesize Mo-containing barium titanate of 100 nm in average grain size based on a SEM photograph.

A multilayer ceramic capacitor was produced in the same manner as in Example 11, except that this Mo-containing barium titanate was used. As a result, the average valence number of Mo became 5.42. The result of the high-temperature accelerated service life test of the multilayer ceramic capacitor was 1210 minutes, and the current value after 30 seconds was 0.52 µA.

Example 14

A multilayer ceramic capacitor was produced in the same manner as in Example 12, except that $(Ho_2O_3)/2$ was added by 0.5 mol (equivalent value). As a result, the average valence number of Mo became 5.45. The result of the high-temperature accelerated service life test of the multilayer ceramic capacitor was 200 minutes, and the current value after 30 seconds was 0.3 µA.

Example 15

A multilayer ceramic capacitor was produced in the same manner as in Example 12, except that $(Ho_2O_3)/2$ was added by 1.5 mol (equivalent value). As a result, the average valence number of Mo became 5.20. The result of the high-temperature accelerated service life test of the multilayer ceramic capacitor was 1280 minutes, and the current value after 30 seconds was 40 μA.

Example 16

A multilayer ceramic capacitor was produced in the same manner as in Example 12, except that $(Gd_2O_3)/2$ was used instead of $(Ho_2O_3)/2$. As a result, the average valence number of Mo became 5.30. The result of the high-temperature accelerated service life test of the multilayer ceramic capacitor was 980 minutes, and the current value after 30 seconds was 20 μA.

Example 17

A multilayer ceramic capacitor was produced in the same manner as in Example 12, except that $(Dy_2O_3)/2$ was used instead of $(Ho_2O_3)/2$. As a result, the average valence number of Mo became 5.40. The result of the high-temperature accelerated service life test of the multilayer ceramic capacitor was 1040 minutes, and the current value after 30 seconds was 50 μA.

Example 18

A multilayer ceramic capacitor was produced in the same manner as in Example 12, except that $(Y_2O_3)/2$ was used instead of $(Ho_2O_3)/2$. As a result, the average valence number of Mo became 5.50. The result of the high-temperature accelerated service life test of the multilayer ceramic capacitor was 300 minutes, and the current value after 30 seconds was 4 μA.

Example 19

A multilayer ceramic capacitor was produced in the same manner as in Example 12, except that a 1:1 mixture of $(Gd_2O_3)/2$ and $(Dy_2O_3)/2$ was used instead of $(Ho_2O_3)/2$. As a result, the average valence number of Mo became 5.34. The result of the high-temperature accelerated service life test of the multilayer ceramic capacitor was 1000 minutes, and the current value after 30 seconds was 30 μA.

Example 20

A multilayer ceramic capacitor was produced in the same manner as in Example 12, except that $MoO_3$ was added by 0.3 mol (equivalent value). As a result, the average valence number of Mo became 5.20. The result of the high-temperature accelerated service life test of the multilayer ceramic capacitor was 1350 minutes, and the current value after 30 seconds was 58 μA.

Example 21

A multilayer ceramic capacitor was produced in the same manner as in Example 12, except that $MnCO_3$ was added by 0.15 mol (equivalent value). As a result, the average valence number of Mo became 5.44. The result of the high-temperature accelerated service life test of the multilayer ceramic capacitor was 804 minutes, and the current value after 30 seconds was 0.15 μA.

Example 22

A multilayer ceramic capacitor was produced in the same manner as in Example 12, except that $MnCO_3$ was added by 0.2 mol (equivalent value). As a result, the average valence number of Mo became 5.48. The result of the high-temperature accelerated service life test of the multilayer ceramic capacitor was 600 minutes, and the current value after 30 seconds was 0.07 μA.

Example 23

A multilayer ceramic capacitor was produced in the same manner as in Example 22, except that $(Ho_2O_3)/2$ was added by 0.5 mol (equivalent value). As a result, the average valence number of Mo became 5.50. The result of the high-temperature accelerated service life test of the multilayer ceramic capacitor was 300 minutes, and the current value after 30 seconds was 0.02 μA.

Example 24

A multilayer ceramic capacitor was produced in the same manner as in Example 12, except that $MnCO_3$ was added by 0.25 mol (equivalent value) and $(Ho_2O_3)/2$ was added by 1.5 mol (equivalent value). As a result, the average valence number of Mo became 5.44. The result of the high-temperature accelerated service life test of the multilayer ceramic capacitor was 1200 minutes, and the current value after 30 seconds was 85 μA.

Example 25

A multilayer ceramic capacitor was produced in the same manner as in Example 12, except that $MnCO_3$ was added by 0.03 mol (equivalent value) and $(Ho_2O_3)/2$ was added by 0.4 mol (equivalent value). As a result, the average valence number of Mo became 4.80. The result of the high-temperature accelerated service life test of the multilayer ceramic capacitor was 2250 minutes, and the current value after 30 seconds was 90 μA.

Example 26

A multilayer ceramic capacitor was produced in the same manner as in Example 22, except that 0.1 mol of the 0.2 mol (equivalent value) of $MnCO_3$ in Example 22 was replaced with MgO. As a result, the average valence number of Mo became 5.50. The result of the high-temperature accelerated service life test of the multilayer ceramic capacitor was 400 minutes, and the current value after 30 seconds was 0.01 μA.

Comparative Example 1

A multilayer ceramic capacitor was produced in the same manner as in Example 1, except that $MnCO_3$ was added by 0.02 mol (equivalent value). As a result, the average valence number of Mo became 4.40. The result of the high-temperature accelerated service life test of the multilayer ceramic capacitor was 750 minutes. The current value after 30 seconds was 280 μA which exceeds 100 μA, indicating worsened insulation property (larger leak current). This is probably because the average valence number of Mo became lower than 4.50.

Comparative Example 2

A multilayer ceramic capacitor was produced in the same manner as in Example 5, except that $(Ho_2O_3)/2$ was added by 0.4 mol (equivalent value). As a result, the average valence number of Mo became 5.60. The result of the high-temperature accelerated service life test of the multilayer ceramic capacitor was 95 minutes, and the current value after 30 seconds was 0.07 µA. The service life value became shorter than 100 minutes. This is probably because the average valence number of Mo became higher than 5.50 and the number of oxygen voids increased.

Comparative Example 3

A multilayer ceramic capacitor was produced in the same manner as in Example 5, except that $MoO_3$ was added by 0.05 mol (equivalent value). As a result, the average valence number of Mo became 5.60. The result of the high-temperature accelerated service life test of the multilayer ceramic capacitor was short at 90 minutes, while the current value after 30 seconds was 0.01 µA.

Comparative Example 4

A multilayer ceramic capacitor was produced in the same manner as in Example 12, except that $MnCO_3$ was added by 0.25 mol (equivalent value). As a result, the average valence number of Mo became 5.87. The result of the high-temperature accelerated service life test of the multilayer ceramic capacitor was short at 96 minutes, while the current value after 30 seconds was 0.03 µA.

Comparative Example 5

A multilayer ceramic capacitor was produced in the same manner as in Example 12, except that $(Ho_2O_3)/2$ was added by 2.00 mol (equivalent value). As a result, deposits containing Ho and Si generated and the current value after 30 seconds exceeded 1000 µA, indicating worsened insulation property (larger leak current).

Comparative Example 6

A multilayer ceramic capacitor was produced in the same manner as in Example 12, except that $MoO_3$ was added by 0.4 mol (equivalent value). As a result, the average valence number of Mo became 4.45. The result of the high-temperature accelerated service life test of the multilayer ceramic capacitor was 900 minutes, while the current value after 30 seconds was 200 µA, indicating worsened insulation property (larger leak current).

The above results are summarized in Table 1 below. These results show that a multilayer ceramic capacitor offering excellent service life characteristics and sufficiently suppressing leak current can be obtained so long as the average valence number of Mo is in a range of 4.50 to 5.50. It should be noted that, in Examples 2, 3, 24, and 25, one of the required additive materials under the present invention such as Mn and rare earth R is outside the preferable range; however, the average valence number of Mo is still kept within the range specified by the present invention by adjusting the amounts of other additive materials. As a result, the result of the high-temperature accelerated service life test was also good. Naturally, the average valence number of Mo can be adjusted more easily to the range specified by the present invention if the amounts of the required additive materials under the present invention are within the preferable ranges.

TABLE 1

|  | Mo (mol) | Mn (mol) | V, W (mol) | R (mol) | AV of Mo | service life (min) | IP (leak current, µA) |
|---|---|---|---|---|---|---|---|
| Example 1 | 0.2 | 0.03 | 0.184(W) | 0.75(Ho) | 4.55 | 640 | 90 |
| Example 2 | 0.2 | 0.02 | 0.184(W) | 0.50(Ho) | 4.52 | 470 | 95 |
| Example 3 | 0.2 | 0.15 | 0.184(W) | 1.80(Ho) | 4.90 | 950 | 85 |
| Example 4 | 0.2 | 0.03 | 0.184(W) | 1.50(Ho) | 4.50 | 900 | 95 |
| Example 5 | 0.2 | 0.075 | 0.184(W) | 0.75(Ho) | 4.90 | 1090 | 1.2 |
| Example 6 | 0.2 | 0.075 | 0.184(V + W) | 0.75(Ho) | 5.05 | 1100 | 1 |
| Example 7 | 0.1 | 0.075 | 0.093(V) | 0.75(Ho) | 5.50 | 320 | 0.05 |
| Example 8 | 0.2 | 0.075 | 0.093(V) | 0.75(Ho) | 5.47 | 800 | 0.2 |
| Example 9 | 0.2 | 0.075 | 0.046(V) | 0.75(Ho) | 5.50 | 300 | 0.07 |
| Example 10 | 0.2 | 0.075 | 0.250(V) | 0.75(Ho) | 5.10 | 1020 | 81 |
| Example 11 | 0.1 | 0.075 | 0.184(V) | 0.75(Ho) | 5.48 | 580 | 0.1 |
| Example 12 | 0.2 | 0.075 | 0.184(V) | 0.75(Ho) | 5.43 | 1180 | 0.1 |
| Example 13 | 0.2 | 0.075 | 0.184(V) | 0.75(Ho) | 5.42 | 1210 | 0.52 |
| Example 14 | 0.2 | 0.075 | 0.184(V) | 0.50(Ho) | 5.45 | 200 | 0.3 |
| Example 15 | 0.2 | 0.075 | 0.184(V) | 1.50(Ho) | 5.20 | 1280 | 40 |
| Example 16 | 0.2 | 0.075 | 0.184(V) | 0.75(Gd) | 5.30 | 980 | 20 |
| Example 17 | 0.2 | 0.075 | 0.184(V) | 0.75(Dy) | 5.40 | 1040 | 50 |
| Example 18 | 0.2 | 0.075 | 0.184(V) | 0.75(Y) | 5.50 | 300 | 4 |
| Example 19 | 0.2 | 0.075 | 0.184(V) | 0.75(Gd + Dy) | 5.34 | 1000 | 30 |
| Example 20 | 0.3 | 0.075 | 0.184(V) | 0.75(Ho) | 5.20 | 1350 | 58 |
| Example 21 | 0.2 | 0.15 | 0.184(V) | 0.75(Ho) | 5.44 | 804 | 0.15 |
| Example 22 | 0.2 | 0.2 | 0.184(V) | 0.75(Ho) | 5.48 | 600 | 0.07 |
| Example 23 | 0.2 | 0.2 | 0.184(V) | 0.50(Ho) | 5.50 | 300 | 0.02 |
| Example 24 | 0.2 | 0.25 | 0.184(V) | 1.50(Ho) | 5.44 | 1200 | 85 |
| Example 25 | 0.2 | 0.03 | 0.184(V) | 0.40(Ho) | 4.80 | 2250 | 90 |
| Example 26 | 0.2 | Mn0.1, Mg0.1 | 0.184(V) | 0.75(Ho) | 5.50 | 400 | 0.01 |
| CE 1 | 0.2 | 0.02 | 0.184(W) | 0.75(Ho) | 4.40 | 750 | 280 |
| CE 2 | 0.2 | 0.075 | 0.184(W) | 0.40(Ho) | 5.60 | 95 | 0.07 |
| CE 3 | 0.05 | 0.075 | 0.184(W) | 0.75(Ho) | 5.60 | 90 | 0.01 |
| CE 4 | 0.2 | 0.25 | 0.184(V) | 0.75(Ho) | 5.87 | 96 | 0.03 |
| CE 5 | 0.2 | 0.075 | 0.184(V) | 2.00(Ho) | — | — | ≥1000 |
| CE 6 | 0.4 | 0.075 | 0.184(V) | 0.75(Ho) | 4.45 | 900 | 200 |

Symbols used in Table 1 are as follows: Mo (mol): Amount of Mo (mol); Mn (mol): Amount of Mn (mol); V, W (mol): Amount of V, W (mol); R (mol): Amount of rare earth R (mol); AV of Mo: Average valence number of Mo; Service life (min): High-temperature accelerated service life (min); IP (leak current, µA): Insulation property (leak current, µA); CE 1: Comparative Example 1; CE 2: Comparative Example 2; CE 3: Comparative Example 3; CE 4: Comparative Example 4; CE 5: Comparative Example 5; CE 6: Comparative Example 6.

Example 4-2

A multilayer ceramic capacitor was produced in the same manner as in Example 4, except that the thickness of the dielectric layer was adjusted to 0.6 µm and that of the internal electrode layer to 0.7 µm, after sintering. As a result, the average valence number of Mo became 4.50. The result of the high-temperature accelerated service life test (time until the insulation resistivity ($\rho$) becomes $1 \times 10^{10}$ Ωcm at 105° C. in a direct-current electric field of 30 V/µm) of the multilayer ceramic capacitor was 840 minutes, and the current value after 30 seconds was 96 µA.

Example 4-3

A multilayer ceramic capacitor was produced in the same manner as in Example 4, except that the thickness of the dielectric layer was adjusted to 0.4 µm and that of the internal electrode layer to 0.5 µm, after sintering. As a result, the average valence number of Mo became 4.50. The result of the high-temperature accelerated service life test (time until the insulation resistivity ($\rho$) becomes $1 \times 10^{10}$ Ωcm at 105° C. in a direct-current electric field of 12 V/µm) of the multilayer ceramic capacitor was 790 minutes, and the current value after 30 seconds was 98 µA.

Example 4-4

A multilayer ceramic capacitor was produced in the same manner as in Example 4, except that the thickness of the dielectric layer was adjusted to 1.0 µm and that of the internal electrode layer to 0.9 µm, after sintering. As a result, the average valence number of Mo became 4.50. The result of the high-temperature accelerated service life test (time until the insulation resistivity ($\rho$) becomes $1 \times 10^{10}$ Ωcm at 105° C. in a direct-current electric field of 50 V/µm) of the multilayer ceramic capacitor was 960 minutes, and the current value after 30 seconds was 91 µA.

Example 23-2

A multilayer ceramic capacitor was produced in the same manner as in Example 23, except that the thickness of the dielectric layer was adjusted to 0.6 µm and that of the internal electrode layer to 0.7 µm, after sintering. As a result, the average valence number of Mo became 5.50. The result of the high-temperature accelerated service life test (time until the insulation resistivity ($\rho$) becomes $1 \times 10^{10}$ Ωcm at 105° C. in a direct-current electric field of 30 V/µm) of the multilayer ceramic capacitor was 260 minutes, and the current value after 30 seconds was 0.05 µA.

Example 23-3

A multilayer ceramic capacitor was produced in the same manner as in Example 23, except that the thickness of the dielectric layer was adjusted to 0.4 µm and that of the internal electrode layer to 0.5 µm, after sintering. As a result, the average valence number of Mo became 5.50. The result of the high-temperature accelerated service life test (time until the insulation resistivity ($\rho$) becomes $1 \times 10^{10}$ Ωcm at 105° C. in a direct-current electric field of 12 V/µm) of the multilayer ceramic capacitor was 190 minutes, and the current value after 30 seconds was 0.11 µA.

Example 23-4

A multilayer ceramic capacitor was produced in the same manner as in Example 23, except that the thickness of the dielectric layer was adjusted to 1.0 µm and that of the internal electrode layer to 0.9 µm, after sintering. As a result, the average valence number of Mo became 5.50. The result of the high-temperature accelerated service life test (time until the insulation resistivity ($\rho$) becomes $1 \times 10^{10}$ Ωcm at 105° C. in a direct-current electric field of 50 V/µm) of the multilayer ceramic capacitor was 340 minutes, and the current value after 30 seconds was 0.02 µA.

Comparative Example 1-2

A multilayer ceramic capacitor was produced in the same manner as in Comparative Example 1, except that the thickness of the dielectric layer was adjusted to 0.6 µm and that of the internal electrode layer to 0.7 µm, after sintering. As a result, the average valence number of Mo became 4.40. The result of the high-temperature accelerated service life test (time until the insulation resistivity ($\rho$) becomes $1 \times 10^{10}$ Ωcm at 105° C. in a direct-current electric field of 30 V/µm) of the multilayer ceramic capacitor was 630 minutes, and the current value after 30 seconds was 320 µA.

Comparative Example 1-3

A multilayer ceramic capacitor was produced in the same manner as in Comparative Example 1, except that the thickness of the dielectric layer was adjusted to 0.4 µm and that of the internal electrode layer to 0.5 µm, after sintering. As a result, the average valence number of Mo became 4.40. The result of the high-temperature accelerated service life test (time until the insulation resistivity ($\rho$) becomes $1 \times 10^{10}$ Ωcm at 105° C. in a direct-current electric field of 12 V/µm) of the multilayer ceramic capacitor was 510 minutes, and the current value after 30 seconds was 390 µA.

Comparative Example 1-4

A multilayer ceramic capacitor was produced in the same manner as in Comparative Example 1, except that the thickness of the dielectric layer was adjusted to 1.0 µm and that of the internal electrode layer to 0.9 µm, after sintering. As a result, the average valence number of Mo became 4.40. The result of the high-temperature accelerated service life test (time until the insulation resistivity ($\rho$) becomes $1 \times 10^{10}$ Ωcm at 105° C. in a direct-current electric field of 50 V/µm) of the multilayer ceramic capacitor was 790 minutes, and the current value after 30 seconds was 110 µA.

Comparative Example 2-2

A multilayer ceramic capacitor was produced in the same manner as in Comparative Example 2, except that the thickness of the dielectric layer was adjusted to 0.6 µm and that of the internal electrode layer to 0.7 µm, after sintering.

As a result, the average valence number of Mo became 5.60. The result of the high-temperature accelerated service life test (time until the insulation resistivity (ρ) becomes $1\times10^{10}$ Ωcm at 105° C. in a direct-current electric field of 30 V/μm) of the multilayer ceramic capacitor was 88 minutes, and the current value after 30 seconds was 0.14 μA.

Comparative Example 2-3

A multilayer ceramic capacitor was produced in the same manner as in Comparative Example 2, except that the thickness of the dielectric layer was adjusted to 0.4 μm and that of the internal electrode layer to 0.5 μm, after sintering. As a result, the average valence number of Mo became 5.60. The result of the high-temperature accelerated service life test (time until the insulation resistivity (ρ) becomes $1\times10^{10}$ Ωcm at 105° C. in a direct-current electric field of 12 V/μm) of the multilayer ceramic capacitor was 65 minutes, and the current value after 30 seconds was 0.22 μA.

Comparative Example 2-4

A multilayer ceramic capacitor was produced in the same manner as in Comparative Example 2, except that the thickness of the dielectric layer was adjusted to 1.0 μm and that of the internal electrode layer to 0.9 μm, after sintering. As a result, the average valence number of Mo became 5.60. The result of the high-temperature accelerated service life test (time until the insulation resistivity (ρ) becomes $1\times10^{10}$ Ωcm at 105° C. in a direct-current electric field of 12 V/μm) of the multilayer ceramic capacitor was 101 minutes, and the current value after 30 seconds was 0.08 μA.

The above results are summarized in Table 2 below.

TABLE 2

| | TDL (μm) | AV of Mo | Service life (min) | IP (leak current, μm) | DC |
|---|---|---|---|---|---|
| Example 4-2 | 0.6 | 4.50 | 840 | 96 | Example 4 |
| Example 4-3 | 0.4 | 4.50 | 790 | 98 | Example 4 |
| Example 4-4 | 1 | 4.50 | 960 | 91 | Example 4 |
| Example 23-2 | 0.6 | 5.50 | 260 | 0.05 | Example 23 |
| Example 23-3 | 0.4 | 5.50 | 190 | 0.11 | Example 23 |
| Example 23-4 | 1 | 5.50 | 340 | 0.02 | Example 23 |
| CE 1-2 | 0.6 | 4.40 | 630 | 320 | CE 1 |
| CE 1-3 | 0.4 | 4.40 | 510 | 390 | CE 1 |
| CE 1-4 | 1 | 4.40 | 790 | 110 | CE 1 |
| CE 2-2 | 0.6 | 5.60 | 88 | 0.14 | CE 2 |
| CE 2-3 | 0.4 | 5.60 | 65 | 0.22 | CE 2 |
| CE 2-4 | 1 | 5.60 | 101 | 0.08 | CE 2 |

Symbols used in Table 2 are as follows: TDL (μm): Thickness of dielectric layer (μm); AV of Mo: Average valence number of Mo; Service life (min): High-temperature accelerated service life (min); IP (leak current, μm): Insulation property (leak current, μm); DC: Dielectric composition; CE 1-2: Comparative Example 1-2; CE 1-3: Comparative Example 1-3; CE 1-4: Comparative Example 1-4; CE 2-2: Comparative Example 2-2; CE 2-3: Comparative Example 2-3; CE 2-4: Comparative Example 2-4; CE 1: Comparative Example 1; CE 2: Comparative Example 2.

Comparing the results of Tables 1 and 2 shows that the average valence number of Mo is basically not influenced by the thickness of the dielectric layer.

Also, from Table 2, the effects of adjusting the average valence number of Mo within the range specified by the present invention manifest more favorably when the dielectric layer is thinner, especially when the thickness of the dielectric layer is 0.8 μm or less. Furthermore, from Table 2, a multilayer ceramic capacitor offering excellent service life characteristics and suppressing leak current, whose characteristics hardly drop when the dielectric layer becomes even thinner to 0.6 μm or less, can be obtained so long as the average valence number of Mo is within the range specified by the present invention.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2015-148649, filed Jul. 28, 2015, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A multilayer ceramic capacitor, comprising:
a laminate constituted by internal electrode layers of different polarities alternately stacked via dielectric layers, wherein:
the dielectric layers contain ceramic grains whose primary component is $BaTiO_3$;
the ceramic grains contain Mo, Mn, rare earth R, and at least one of V and W, but contain none of Mg, Li, and Cr, and
an average valence number of Mo in the ceramic grains is 4.50 to 5.50.

2. A multilayer ceramic capacitor according to claim 1, wherein an amount of Mo in the dielectric layer is 0.1 to 0.3 mol per 100 mol of $BaTiO_3$.

3. A multilayer ceramic capacitor according to claim 2, wherein an amount of Mn in the dielectric layer is 0.03 to 0.20 mol per 100 mol of $BaTiO_3$.

4. A multilayer ceramic capacitor according to claim 3, wherein an amount of rare earth R in the dielectric layer is 0.5 to 1.5 mol per 100 mol of $BaTiO_3$.

5. A multilayer ceramic capacitor according to claim 4, wherein a thickness of the dielectric layer is 0.8 μm or less.

6. A multilayer ceramic capacitor according to claim 3, wherein a thickness of the dielectric layer is 0.8 μm or less.

7. A multilayer ceramic capacitor according to claim 2, wherein an amount of rare earth R in the dielectric layer is 0.5 to 1.5 mol per 100 mol of $BaTiO_3$.

8. A multilayer ceramic capacitor according to claim 7, wherein a thickness of the dielectric layer is 0.8 μm or less.

9. A multilayer ceramic capacitor according to claim 2, wherein a thickness of the dielectric layer is 0.8 μm or less.

10. A multilayer ceramic capacitor according to claim 1, wherein an amount of Mn in the dielectric layer is 0.03 to 0.20 mol per 100 mol of $BaTiO_3$.

11. A multilayer ceramic capacitor according to claim 10, wherein an amount of rare earth R in the dielectric layer is 0.5 to 1.5 mol per 100 mol of $BaTiO_3$.

12. A multilayer ceramic capacitor according to claim 11, wherein a thickness of the dielectric layer is 0.8 μm or less.

13. A multilayer ceramic capacitor according to claim 10, wherein a thickness of the dielectric layer is 0.8 μm or less.

14. A multilayer ceramic capacitor according to claim 1, wherein an amount of rare earth R in the dielectric layer is 0.5 to 1.5 mol per 100 mol of $BaTiO_3$.

15. A multilayer ceramic capacitor according to claim 14, wherein a thickness of the dielectric layer is 0.8 μm or less.

16. A multilayer ceramic capacitor according to claim 1, wherein a thickness of the dielectric layer is 0.8 μm or less.

\* \* \* \* \*